US012631061B2

(12) United States Patent
 Larson

(10) Patent No.: US 12,631,061 B2
(45) Date of Patent: May 19, 2026

(54) DUAL-AXIS OVER-MOLDED HINGE

(71) Applicant: Reell Precision Manufacturing Corporation, St. Paul, MN (US)

(72) Inventor: George Larson, Roseville, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 558 days.

(21) Appl. No.: 17/961,389

(22) Filed: Oct. 6, 2022

(65) Prior Publication Data

US 2023/0023366 A1     Jan. 26, 2023

Related U.S. Application Data

(63) Continuation of application No. 16/895,693, filed on Jun. 8, 2020, now abandoned.

(60) Provisional application No. 62/858,024, filed on Jun. 6, 2019.

(51) Int. Cl.
 *E05D 3/12*     (2006.01)
 *E05D 11/02*     (2006.01)
 *E05D 11/08*     (2006.01)
 *B29C 45/14*     (2006.01)
 *B29L 31/22*     (2006.01)

(52) U.S. Cl.
 CPC ............... *E05D 3/12* (2013.01); *E05D 11/02* (2013.01); *E05D 11/082* (2013.01); *B29C 45/14336* (2013.01); *B29L 2031/22* (2013.01); *E05Y 2800/46* (2013.01); *E05Y 2800/676* (2013.01); *E05Y 2900/132* (2013.01)

(58) Field of Classification Search
 CPC .......... E05D 3/12; E05D 11/082; E05D 11/02
 See application file for complete search history.

(56) References Cited

U.S. PATENT DOCUMENTS

| 401,086 A | 4/1889 | Turner |
| 1,735,696 A * | 11/1929 | Ridley ..................... E05D 3/12 |
| | | 16/371 |
| 4,351,555 A | 9/1982 | Hashimoto |

(Continued)

FOREIGN PATENT DOCUMENTS

| CN | 105972061 | 9/2016 |
| DE | 10 2015 013 322 | 12/2016 |

(Continued)

OTHER PUBLICATIONS

Non-Final Office Action dated Jan. 7, 2022 in U.S. Appl. No. 16/895,693.

(Continued)

*Primary Examiner* — Jeffrey O'Brien
(74) *Attorney, Agent, or Firm* — Dicke, Billig & Czaja, PLLC

(57) ABSTRACT

One aspect is an overmolded hinge device having a first and a second shaft, each having first and second ends. A first friction element is mounted on the first shaft. A first molded housing is at least partially enclosing the first shaft and a second molded housing is at least partially enclosing the second shaft. A first molded outer link is at least partially enclosing each of the first and second shafts and a second molded outer link is at least partially enclosing each of the first and second shafts. One of the first molded housing and the first molded outer link enclose the first friction element

15 Claims, 7 Drawing Sheets

(56) References Cited

U.S. PATENT DOCUMENTS

| | | | |
|---|---|---|---|
| 4,489,660 A | 12/1984 | Tamamushi | |
| 6,261,499 B1 * | 7/2001 | Okeke | B29C 45/0017 |
| | | | 264/255 |
| 6,378,172 B1 * | 4/2002 | Schrage | E05D 3/12 |
| | | | 160/199 |
| RE37,712 E * | 5/2002 | Gannon | E05D 11/082 |
| | | | 16/342 |
| 6,467,129 B1 * | 10/2002 | Bae | G06F 1/1681 |
| | | | 16/337 |
| 6,530,123 B1 * | 3/2003 | Wahlstedt | G06F 1/1681 |
| | | | 16/337 |
| 6,767,051 B2 | 7/2004 | Erlandsson | |
| 7,058,433 B2 * | 6/2006 | Carpenter | H04M 1/022 |
| | | | 455/90.3 |
| 7,155,266 B2 | 12/2006 | Stefansen | |
| 7,299,523 B2 | 11/2007 | Zou | |
| 7,418,766 B2 | 9/2008 | Nelson et al. | |
| 8,562,057 B1 | 10/2013 | Schlater et al. | |
| 8,690,233 B2 | 4/2014 | Preisler et al. | |
| 8,854,834 B2 | 10/2014 | O'Connor et al. | |
| 8,875,348 B2 * | 11/2014 | Kossett | G06F 1/1681 |
| | | | 16/342 |
| 9,009,919 B1 | 4/2015 | Chiang | |
| 9,027,205 B2 | 5/2015 | Ahn et al. | |
| 9,134,767 B2 | 9/2015 | Chen et al. | |
| 9,910,458 B2 | 3/2018 | Watanabe et al. | |
| 9,964,988 B2 * | 5/2018 | Rittenhouse | G06F 1/1681 |
| 10,151,128 B2 * | 12/2018 | Hatano | G06F 1/1681 |
| 10,344,510 B2 * | 7/2019 | Siddiqui | E05D 3/122 |
| 10,627,867 B2 | 4/2020 | Cheng et al. | |
| 2002/0144378 A1 * | 10/2002 | Liao | G06F 1/1681 |
| | | | 16/342 |
| 2004/0212968 A1 * | 10/2004 | Lin | E05D 3/12 |
| | | | 361/755 |
| 2007/0234517 A1 * | 10/2007 | Larson | E05D 11/087 |
| | | | 16/342 |
| 2008/0307608 A1 | 12/2008 | Goto | |
| 2011/0265288 A1 | 11/2011 | Chiang | |
| 2012/0023704 A1 * | 2/2012 | Case | G06F 1/1679 |
| | | | 16/337 |
| 2015/0047152 A1 | 2/2015 | Cheng | |
| 2015/0309541 A1 | 10/2015 | Horng | |
| 2020/0018102 A1 * | 1/2020 | Lindberg | E05D 9/005 |
| 2020/0386023 A1 | 12/2020 | Larson | |

FOREIGN PATENT DOCUMENTS

| | | |
|---|---|---|
| EP | 1335567 | 8/2003 |
| FR | 2950581 | 4/2011 |
| GB | 2 542 187 | 3/2017 |
| KR | 200385477 | 5/2005 |
| KR | 20050096314 | 10/2005 |
| WO | 95/00406 | 1/1995 |

OTHER PUBLICATIONS

Final Office Action dated May 6, 2022 in U.S. Appl. No. 16/895,693.

* cited by examiner

DUAL-AXIS OVER-MOLDED HINGE

CROSS REFERENCE TO RELATED APPLICATIONS

The present application is a continuation application of U.S. Ser. No. 16/895,693, filed Jun. 8, 2020 and claims the benefit of the filing date of U.S. Provisional Patent Application Ser. No. 62/858,024, filed Jun. 6, 2019, both of which are herein incorporated by reference.

BACKGROUND

In many applications, it is useful to have friction hinge with a large range of motion. In many of those applications, it is also required that the hinge have an overall compact size and overall profile. Furthermore, it is important in many applications for such hinges to be manufactured with minimum assembly time, part count and overall hinge cost. A combination of such features, however, can be difficult to accommodate. For these and other reasons, there is a need for the invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting.

It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1:
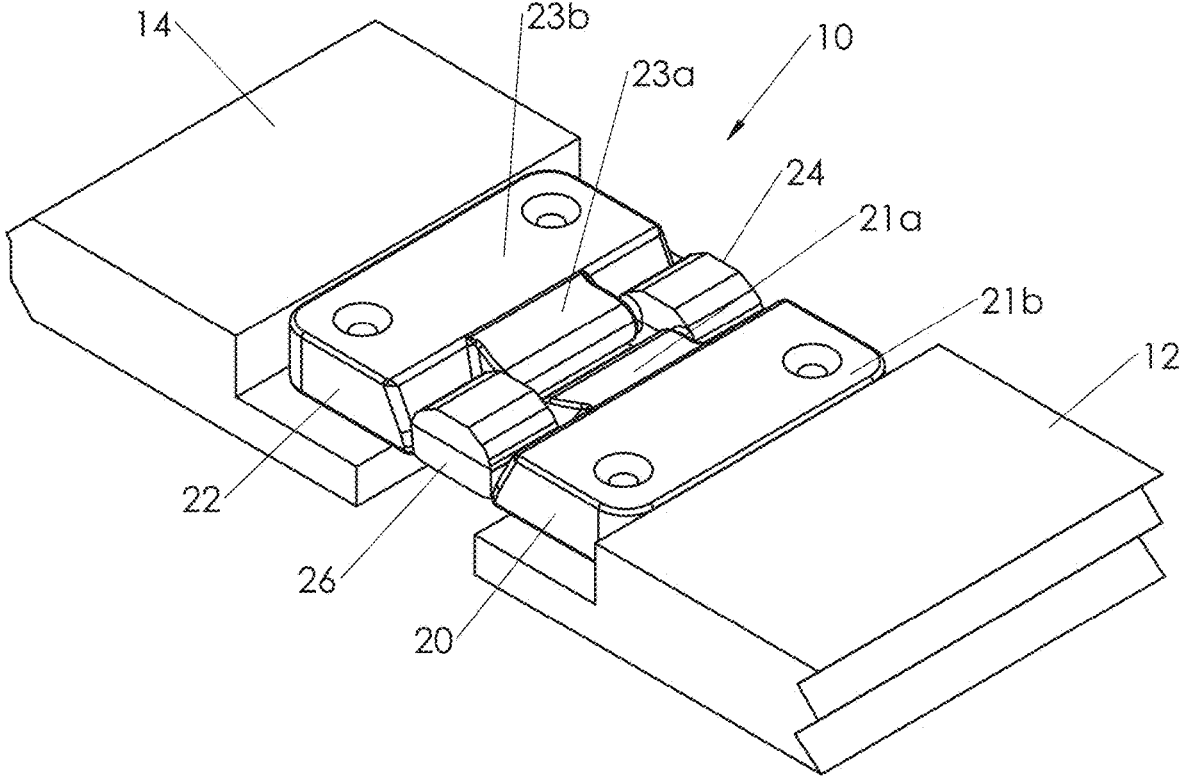
FIG. 1 illustrates a perspective view of an overmolded hinge device in accordance with one embodiment.

FIG. 1 illustrates an overmolded hinge device 10 in accordance with one embodiment. In one embodiment, overmolded hinge device 10 includes first molded housing 20, second molded housing 22, first molded outer link 24, and second molded outer link 26. In one embodiment, first molded housing 20 includes a shaft overmold portion 21*a* and a bracket portion 21*b*, and second molded housing 22 includes a shaft overmold portion 23*a* and a bracket portion 23*b*. In one embodiment, first molded housing 20 is coupled to first hinged element 12 via its bracket portion 21*b*, and second molded housing 22 is coupled to second hinged element 14 via its bracket portion 23*b*. In one embodiment, overmolded hinge device 10 provides controlled rotation over a range of 180° of rotation, of first hinged element 12 relative to second hinged element 14.

In one embodiment, overmolded hinge device 10 includes two separate shafts. In one embodiment, one shaft is at least partially contained within first molded housing 20, for example within shaft overmold portion 21*a*, and at least partially contained within first and second molded outer links 24, 26. Similarly, one shaft is at least partially contained within second molded housing 22, for example within shaft overmold portion 23*a*, and at least partially contained within first and second molded outer links 24, 26.

Using two separate shafts allows for two separate axes of rotation. This is useful in applications requiring a compact hinge design. Furthermore, it can allow a range of 180° of rotation, without having the hinge bump out when folded over on itself and also not project upward when fully extended. Using two shafts within a single device avoids the added cost and space requirements needed for two separate hinges. This configuration allows for flexibility in use.

Figure 2A:
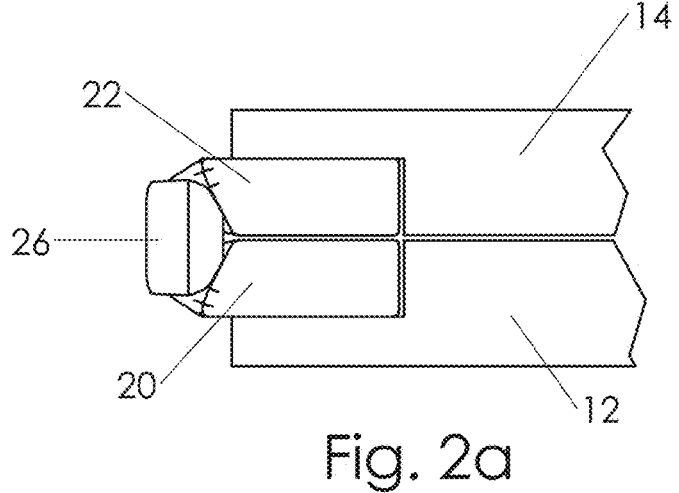
FIGS. 2*a* and 2*b* illustrate end views of an overmolded hinge device in two positions in accordance with one embodiment.
Figure 2B:
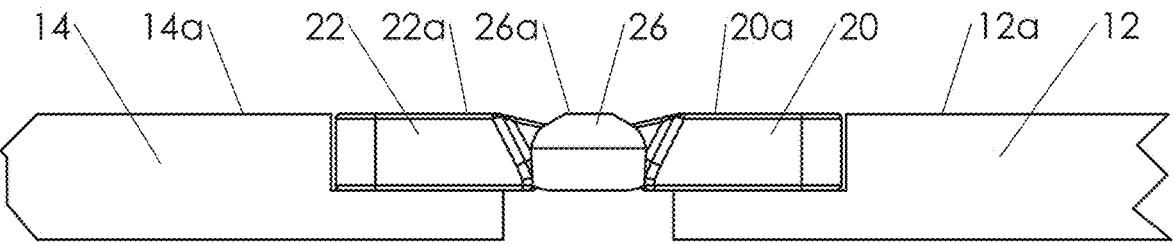

For example, FIGS. 2*a* and 2*b* illustrate overmolded hinge device 10 in two positions. In one embodiment, it may be desired for first and second hinged elements 12, 14 to move between open and closed positions. In one application, first and second hinged elements 12, 14 are panels that are flush on a surface, such as floor. In one embodiment, second hinged element 14 is a movable panel that can be opened over first hinged elements 12, which is fixed. In a fully closed position, illustrated in FIG. 2*b*, the panels are flush with a surface, such as a floor, and in a fully open position, illustrated in FIG. 2*a*, one panel is rotated onto the other. If a comparable hinge was used with a single shaft, part of the hinge, near what is labeled 26, would project up from the main surface in FIG. 2*b* and would project further out to the left in FIG. 2*a*.

Because overmolded hinge device 10 includes two separate shafts, one associated with first molded housing 20 and the other associated with second molded housing 22, overmolded hinge device 10 allows first and second hinged elements 12, 14 to achieve both 180° of rotation, such that second hinged element 14 can rest on first hinged element 12 in the fully open position and not project out significantly to the left as illustrated in FIG. 2*a*, and also achieve a flush configuration when in the fully closed position. In the fully closed position, the flush configuration is where all portions of overmolded hinge device 10 are at or below the topmost surfaces of first and second hinged elements 12, 14. This is a desired configuration, for example, when first and second hinged elements 12, 14 are floor panels and it is important that no portion of overmolded hinge device 10 protrudes up from the floor surface. In one embodiment, in the flush configuration the top surfaces 20a, 22a of first and second molded housings 20, 22, and well as the top surfaces 24a, 26a of first and second molded outer links 24, 26 (first molded outer link 24 not visible in FIG. 2b) are flush with the top surfaces 12a, 14a of first and second hinged elements 12, 14.

Figure 3A:
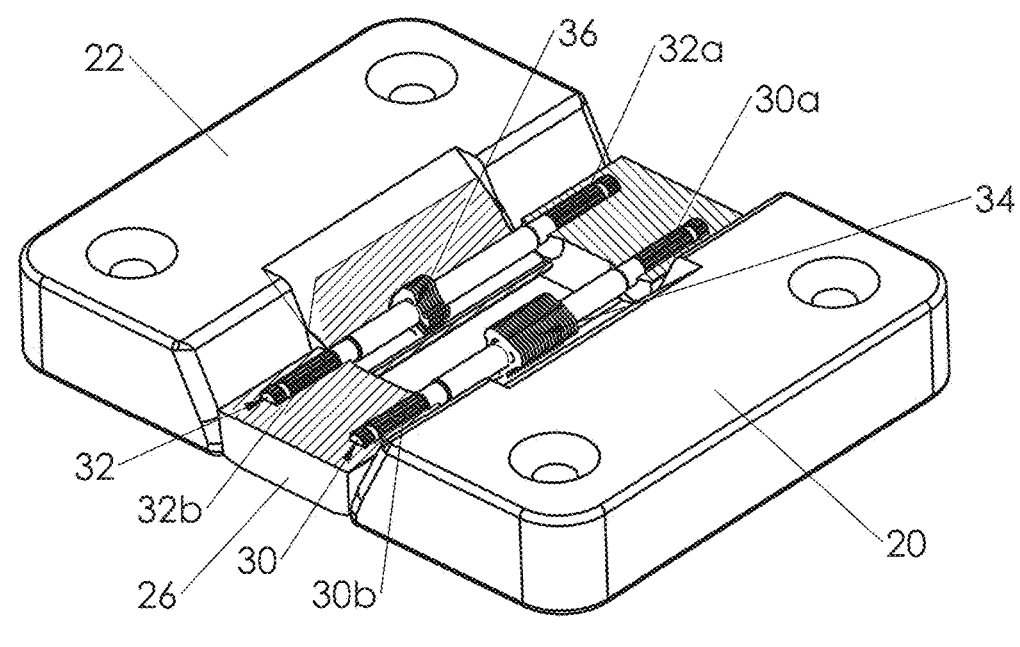
FIGS. 3*a* and 3*b* illustrate perspective views of partial cut-away overmolded hinge devices in accordance with one embodiment.
Figure 3B:
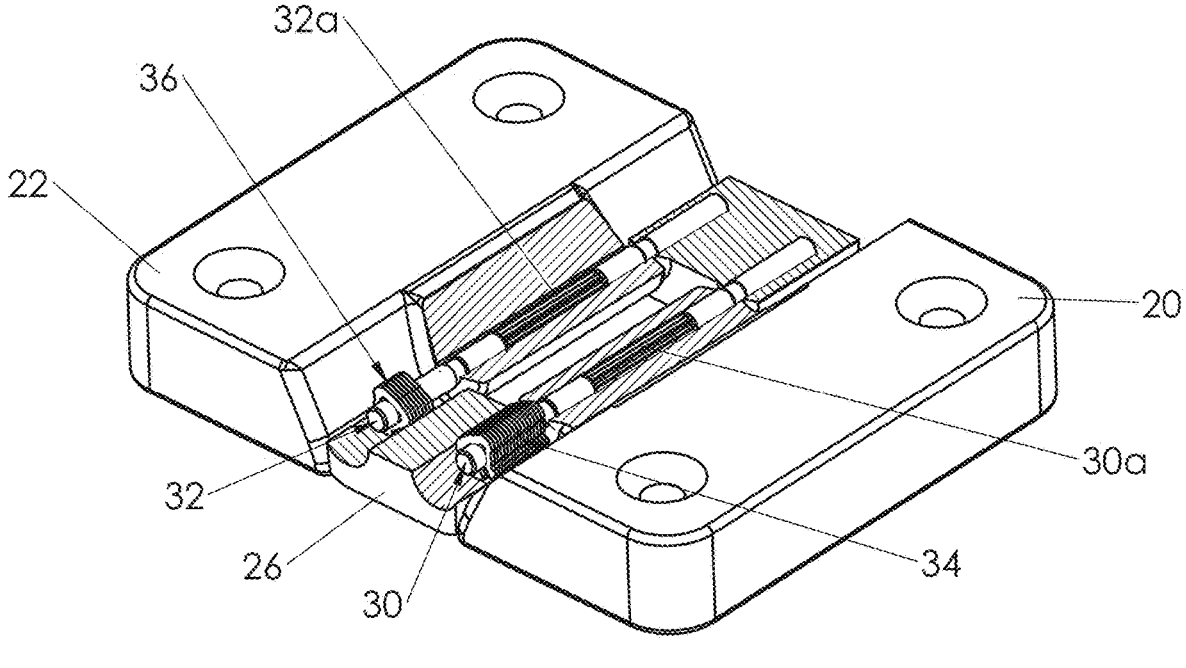

In one embodiment, there is significant weight associated with first and second hinged elements 12, 14. Accordingly, overmolded hinge device 10 includes friction elements to provide sufficient torque for the hinging operation of overmolded hinge device 10. FIGS. 3a and 3b illustrate internal portions of overmolded hinge device 10. In FIGS. 3a and 3b, portions of first molded housing 20, second molded housing 22, first molded outer link 24, and second molded outer link 26 have been partially cut away so that internal parts are visible. Substantially all of shaft overmold portion 21a of first molded housing 20, substantially all of shaft overmold portion 23a of second molded housing 22, and the upper half of first and second molded outer links 24, 26 are removed in FIGS. 3a and 3b.

In one embodiment, overmolded hinge device 10 illustrated in FIGS. 3a and 3b includes first shaft 30, second shaft 32, first friction element 34, and second friction element 36. In one embodiment, first friction element 34 is placed over first shaft 30 in frictional engagement and second friction element 36 is placed over second shaft 32, also in frictional engagement. In one embodiment, each of first and second friction elements 34, 36 are one or more clips placed over the respective shafts 30, 32, such as is described in U.S. Pat. No. RE37,712, which is incorporated herein by reference. The overall torque of overmolded hinge device 10 can be tailored and adjusted by adding or subtracting the number of clips on the respective first and second shafts 30, 32. Producing friction in this way provides consistent torque over the life of the hinge, provides favorable torque density, and provides modularity to adjust torque.

In one embodiment illustrated in FIG. 3a, first friction element 34 includes connection portions or non-round features, which are embedded within shaft overmold portion 21a of first molded housing 20, such that rotation of first molded housing 20 about first shaft 30 also forces the rotation therewith of first friction element 34. Because first shaft 30 is fixed relative to first friction element 34, torque is generated with the relative rotation. Similarly, second friction element 36 includes connection portions or non-round features that are embedded within shaft overmold portion 23a of second molded housing 22 such that rotation of second molded housing 22 about second shaft 32 also forces the rotation therewith of second friction element 36. Because second shaft 32 is fixed relative to second friction element 36, torque is generated with the relative rotation. Such overmolding of friction elements is described, for example, in U.S. Pat. No. 6,530,123, which is incorporated herein by reference.

Also in one embodiment illustrated in FIG. 3a, each of first and second shafts 30, 32 have knurls 30a, 30b, 32a, 32b or similar non-round features at their respective ends. In one embodiment, knurls 30a, 30b, 32a, 32b facilitate holding first shaft 30 fixed relative to first molded housing 20 and holding second shaft 32 fixed relative to second molded housing 22. In one embodiment, knurls 30a, 32a at a respective first end of first and second shafts 30, 32 are embedded within first molded outer link 24 and knurls 30b, 32b at a respective second end of first and second shafts 30, 32 are embedded within second molded outer link 26. Embedding knurls 30a, 30b, 32a, 32b in first and second molded outer links 24, 26 holds first and second shafts 30, 32 fixed relative to the rotation of first and second molded housings 20, 22, thereby generating torque by the respective interference between first and second shafts 30, 32 and first and second friction elements 34, 36 during relative rotation.

In one embodiment illustrated in FIG. 3b, first friction element 34 includes connection portions or non-round features, which are embedded within second molded outer link 26, and first shaft 30 include knurls 30a, which are embedded within shaft overmold portion 21a of first molded housing 20. As such, the rotation of first molded housing 20 about first shaft 30 also forces the rotation therewith of first shaft 30 within friction element 34, which is held from rotation by second molded outer link 26. Because of the frictional engagement of first friction element 34 and first shaft 30, torque is produced with the rotation. Similarly, second friction element 36 includes connection portions or non-round features, which are embedded within second molded outer link 26, and second shaft 30 include knurls 32a, which are embedded within shaft overmold portion 23a of second molded housing 22. As such, the rotation of second molded housing 22 about second shaft 32 also forces the rotation therewith of second shaft 32 within friction element 34, which is held from rotation by second molded outer link 26. Because of the frictional engagement of second friction element 36 and second shaft 32, torque is produced with the relative rotation. In another embodiment, only friction element 34 is used, and/or frictional elements 32, 34 can be divided between first and second molded outer links 24, 26.

In one embodiment, a preassembled torque insert, such as Ti-200 Series Torque Inserts sold by Reell Precision Manufacturing, which is incorporated herein by reference, is used in place of the shafts and friction elements described above. In one embodiment, a preassembled torque insert, such as Ti-200 Series, includes one or more torque elements on a shaft with a zinc tubing over the assembly, such that it is designed for plastic overmolding, and will achieve the toque generation for overmolded hinge device 10. The entire torque insert can be overmolded within one or both of the first and second molded housings 20, 22 and within the first and second molded outer links 24, 26.

In one embodiment, an equal number of clips are used for first and second friction elements 34, 36 over each of first and second shafts 30, 32 so that the torque associated with each of first and second shafts 30, 32 is the same. In one embodiment, the number of clips within first and second friction elements 34, 36 is not the same, such that one of first and second shafts 30, 32 carries more clips, so that the torque associated with each of first and second shafts 30, 32 is not the same.

For example, one embodiment may include an application requiring multiple overmolded hinge devices 10. When such a system includes a panel or door large enough to require multiple overmolded hinge devices 10 to control, variation of the amount of clips in first and second friction elements 34, 36 can be beneficial. For example, if first shaft 30 is attached to first hinged element 12, which is fixed, and second shaft 32 is attached to second hinged element 14, which is rotatable, which axis of the hinge rotates is random when the torque on each shaft 30, 32 is equal.

As such, there can be a benefit in specifying a different torque level for each of first and second shafts 30, 32. With lower torque on first shaft 30, for example, each shaft 30, 32 will travel with the moving second hinged element 14 until a stop position is reached. Controlling this sequence maintains a consistent position of the door during movement, not allowing the second hinged element 14, a door or panel, to become skewed and possibly bind. Placement of the unique "torque elements," that is, a combination of a friction element over a shaft (first friction element 34 and first shaft 30 or second friction element 36 and second shaft 32) within a mold tool can be controlled by positioning the friction elements relative to features in the mold tool, thereby preventing improper assembly.

In one embodiment, only first friction element 34 over first shaft 30 is used, while no friction elements is used over second shaft 32. In this case, second molded housing 22 is just formed directly over second shaft 32, since there is no there is friction element over the shaft. As such, there is little or no torque associated with second shaft 32, which may be useful in some applications. As is apparent, this can be reversed, so that only second friction element 36 over second shaft 32 is used, while no friction elements is used over first shaft 30.

In one embodiment, one or more overmolded hinge devices 10 may be in a system including a large and/or heavy panel or door. In such case, it may be necessary to ensure significant torque is produced by first and second friction elements 34, 36 and first and second shafts 30, 32. For example, a torque range from 1-4 Nm may be needed, and in other applications may need to scale up to 20 Nm. In other applications, it may be appropriate to scale down to 0 torque.

Figure 4:
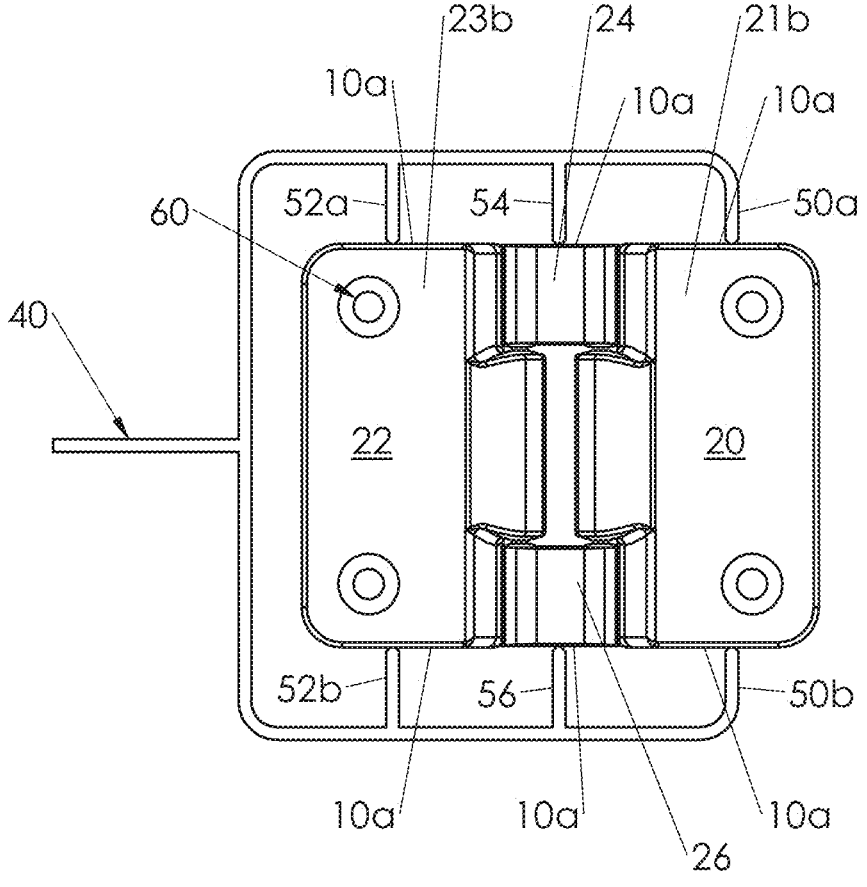
FIG. 4 illustrates a top view of an overmolded hinge device with injection tool runners in accordance with one embodiment.

In one embodiment, the configuration of overmolded hinge device 10 provides significant advantages in the manufacturing process. FIG. 4 illustrates a molding process for overmolded hinge device 10. Overmolded hinge device 10 is illustrated within injection tool runners 40. The mold tool has a cavity that defines the shape that overmolded hinge device 10.

In one embodiment, the mold tool defines connection features 60. In many applications, overmolded hinge device 10 is coupled to hinged elements (such as first and second hinged elements 12, 14 in FIG. 1). It is useful in some embodiments to provide bracket portions 21b, 23b of first and second molded housings 20, 22 with connection features 60 in order to help facilitate coupling overmolded hinge device 10 to panels, doors and other hinged elements. Such connection features can be built into the tool of the mold, and can be recessed features to accommodate bolts or other similar features.

In one embodiment, a significant advantage allowed by the configuration of overmolded hinge device 10 allows for its manufacturing to be in a single injection cycle or shot. First and second friction elements 34, 36 are assembled over each of first and second shafts 30 and 32, and in one embodiment, a lubricant is introduced between the friction elements 34, 36 and shafts 30 and 32. These friction assemblies are then placed within the mold cavity. A single cycle or shot of mold material then flows over the friction assemblies and forms overmolded hinge device 10. This has the advantage of lower cost compared to the previously alternatives, has less injection mold cycle time, less part handling, less inventory to control, and less assembly time. In one embodiment, the assembly is accomplished without any moving parts within the tool of the mold.

As illustrated in FIG. 4, injection gates 50a and 50b inject molding material into a section of the mold cavity to form first molded housing 20, including both shaft overmold portion 21a and bracket portion 21b. Injection gates 52a and

52b inject molding material into a section of the mold cavity to form second molded housing 22, including both shaft overmold portion 23a and bracket portion 23b. Injection gate 54 injects molding material into a section of the mold cavity to form first molded outer link 24. Injection gate 54 injects molding material into a section of the mold cavity to form second molded outer link 26. In one embodiment, because of the relative configuration and proximity of these various section of overmolded hinge device 10, each of these injections can occur in one cycle or shot, at relatively the same time.

Because first and second molded outer links 24, 26 are each located outside both friction overmold portions 21a, 23a of first and second molded housings 20, 24, they are readily accessible for injection gates. FIG. 4 illustrates an outer periphery 10a of overmolded hinge device 10. At least some portion of each of first and second molded housings 20, 22 and each of first and second molded outer links 24, 26 lie on the outer periphery 10a of overmolded hinge device 10. Accordingly, each are readily accessible and adjacent respective injection gates 50a, 50b, 52a, 52b, 54 and 56 such that they can all be formed in a single injection cycle.

Figure 5A:
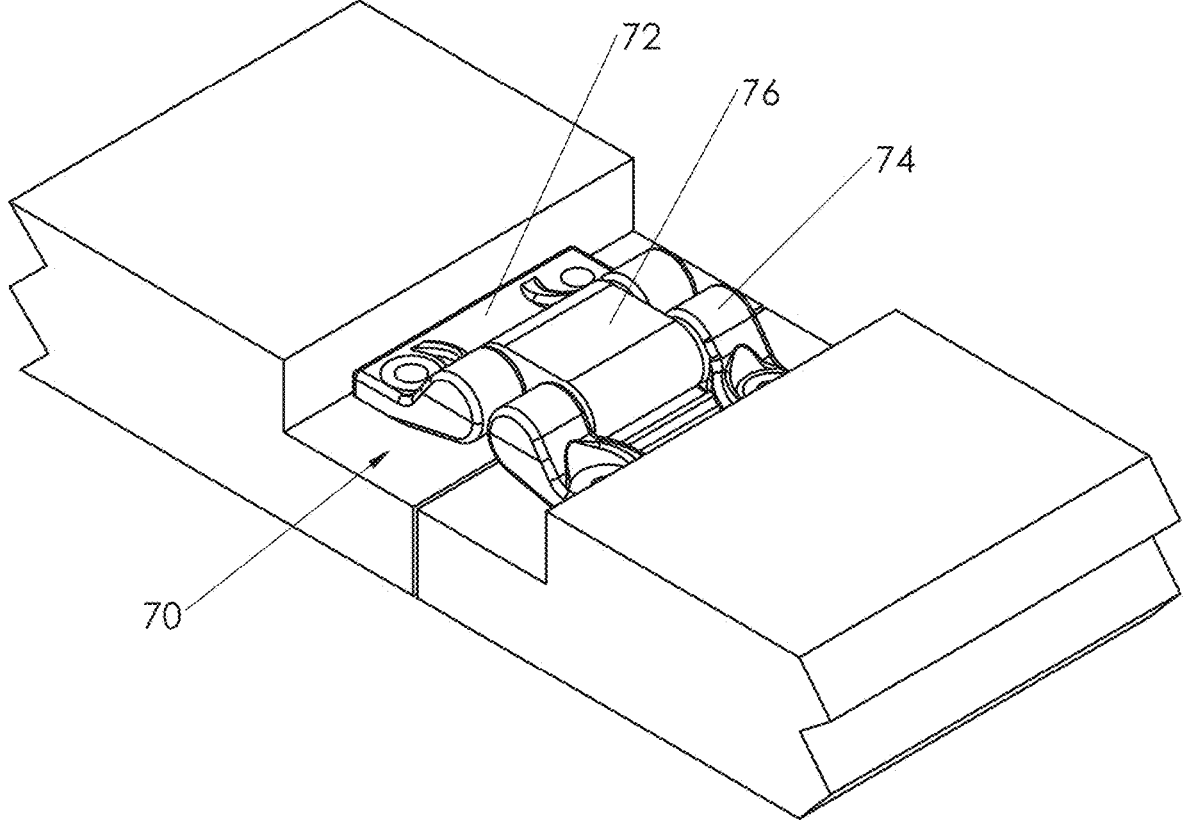
FIG. 5*a* illustrates a perspective view of an overmolded hinge device in accordance with the prior art.
Figure 5B:
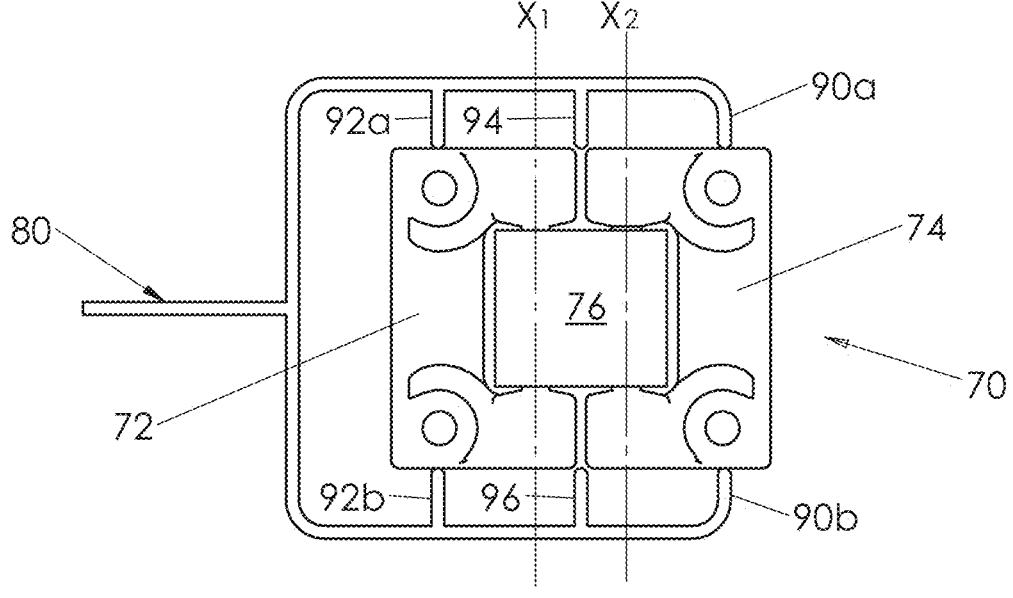
FIG. 5*b* illustrates a top view of a prior art overmolded hinge device with injection tool runners.

Such efficiencies in manufacturing and advantageous configuration is not possible with existing designs. For example, FIGS. 5a-5b illustrate an overmolded hinge 70, which suffers from disadvantages in manufacturing that will increase costs and cycle time. Overmolded hinge 70 includes first hinge portion 72, second hinge portion 74 and center hinge portion 76. It includes two shafts, a first shaft having its ends contained within first hinge portion 72 and a second shaft having its ends contained within second hinge portion 74. Each shaft also includes friction elements on the shaft, and each set of friction elements are contained within center hinge portion 76. Because overmolded hinge 70 includes two shafts, it allows favorable rotation range. Also, overmolded hinge 70 has one fewer part (one center hinge portion 76 instead of first and second molded outer links 24, 26), which is why such a "center link" design is considered to be the existing solution. The manufacture of the overmolded hinge 70, however, suffers disadvantages.

As illustrated in FIG. 5b, unlike overmolded hinge device 10 described above, overmolded hinge 70 cannot be formed in a single cycle injection for many applications. Overmolded hinge 70 is illustrated within injection tool runners 80. While injection gates 92a and 92b are able to inject molding material into a section of the mold cavity to form first hinge portion 72 and similarly, injection gates 90a and 90b are able to inject molding material into a section of the mold cavity to form second hinge portion 74, neither injection gates 94 or 96 are able to inject molding material for center hinge portion 76. This is because center hinge portion 76 is located within first and second hinge portions 72, 74, so there is not access to inject that portion of the part. Furthermore, because the requirements of most applications dictate that hinges are as compact as possible, it is not practical to leave enough space between the hinge portions to allow access for injection gates. Accordingly, the manufacturing of overmolded hinge 70 requires multiples injection cycles, increasing time, cost and possibility for assembly error.

A center axis $X_1$ and $X_2$ is illustrated in dashed lines in FIG. 5b for each of the shafts that are contained within overmolded hinge 70. As is apparent, the molded material around the shafts for each of first and second hinge portions 74, 76 necessitate that the first and second hinge portions 74, 76 are too close to each other to allow gates 94 and 96 to get access to center hinge portion 76. While moving center axes $X_1$ and $X_2$ apart from each other could potentially allow such access, this defeats the compactness of the design that is needed for many applications. Moving the shafts apart also moves apart the hinged elements to which the hinge 70 is attached, and this is typically not a desired design.

Figure 6A:
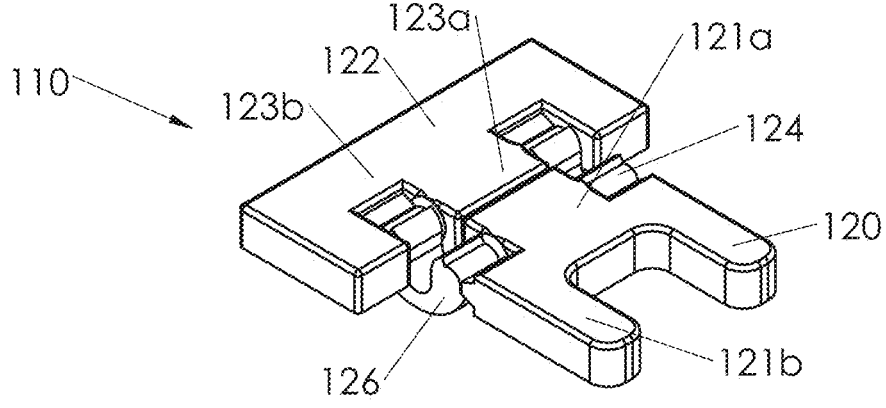
FIG. 6*a*-6*b* illustrate perspective and top plan views of an overmolded hinge device in accordance with one embodiment.
Figure 6B:
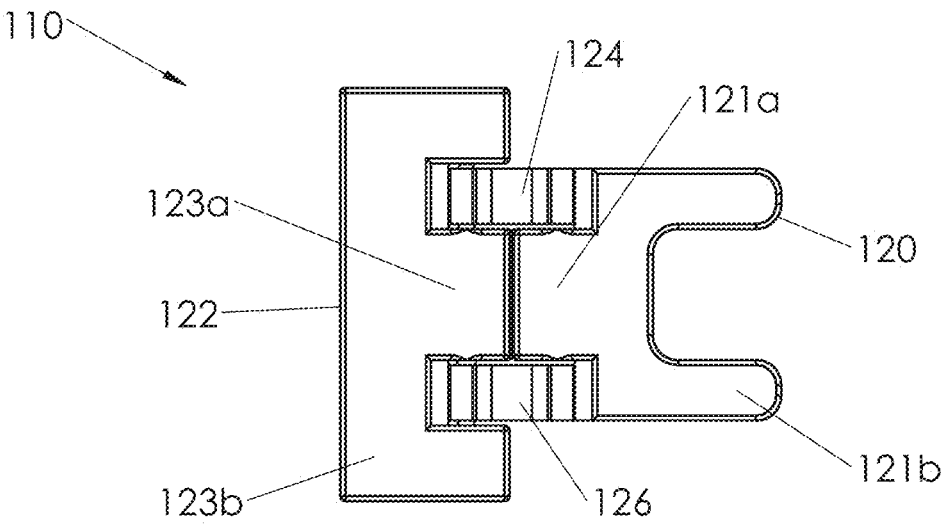

In addition to its manufacturing advantages, the nature of overmolded hinge device 10 allows for a variety of configurations. FIGS. 6a-6b illustrate an alternative overmolded hinge device 110 in accordance with one embodiment. Similar to overmolded hinge device 10 described above, in one embodiment, overmolded hinge device 110 includes first molded housing 120, second molded housing 122, first molded outer link 124, and second molded outer link 126. In one embodiment, first molded housing 120 includes a shaft overmold portion 121a and a bracket portion 121b, and second molded housing 122 includes a shaft overmold portion 123a and a bracket portion 123b.

Similar to overmolded hinge device 10 described above, in one embodiment, overmolded hinge device 110 includes a first shaft with a first friction element with shaft overmold portion 121a, and a second shaft with a second friction element shaft overmold portion 123a. Also like above, one of the shaft may include a friction element, while the other does not.

In one embodiment, first molded housing 120 can be coupled to a hinged element via its bracket portion 121b, and second molded housing 122 can be coupled to another hinged element via its bracket portion 23b, with connection features not shown on the underside of the brackets. In one embodiment, overmolded hinge device 110 provides controlled rotation, in one embodiment over 180° of rotation, of one hinged element relative to another.

In one embodiment, overmolded hinge device 110 includes two separate shafts. In one embodiment, one shaft is at least partially contained within first molded housing 120, for example within shaft overmold portion 121a, and at least partially contained within first and second molded outer links 124, 126. Similarly, one shaft is at least partially contained within second molded housing 122, for example within shaft overmold portion 123a, and at least partially contained within first and second molded outer links 124, 126. Formation of overmolded hinge device 110 can be done in a mold process as described above for overmolded hinge device 10.

As is evident, the overall shapes of the various portions of overmolded hinge device 110 can be varied. Specifically, each of first molded housing 120, second molded housing 122, first molded outer link 124, and second molded outer link 126 can be configured and tailored for the particular desired application. For example, first and second molded outer links 124, 126 have a u-shaped configuration, which will create a unique rotating profile for first molded housing 120 relative to second molded housing 122. In addition, in some applications it may be useful to uniquely shape bracket portions 121b, 123b in order to uniquely mount overmolded hinge device 110 to hinged elements.

In addition to using the friction assemblies within shaft overmold portions 121a, 123a, or using just a single friction assembly, a one-way clutch device can be added in order to control sequencing and add value to the hinge in some applications. Adding a one-way clutch provides the functionality of lower operator forces in one direction that can be valuable with heavier doors or panels with horizontal axes. Any of a variety of one-way clutch devices can be used, such as a spring, a sprag, a roller or other similar based devices.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An overmolded friction hinge device comprising:
   a first and a second shaft, each having first and second ends;
   a first friction element mounted on the first shaft;
   a first molded housing at least partially enclosing the first shaft;
   a first hinged element coupled to the first molded housing, the first hinged element comprising a heavy panel;
   a second molded housing at least partially enclosing the second shaft;
   a second hinged element coupled to the second molded housing;
   a first molded outer link at least partially enclosing each of the first and second shafts; and
   a second molded outer link at least partially enclosing each of the first and second shafts;
   wherein one of the first molded housing and the first molded outer link are overmolded over and enclose the first friction element such that first friction element is embedded within one of the first molded housing and the first molded outer link such that there is no relative movement between the first friction element and the first molded housing or the first molded outer link;
   wherein a torque is produced by the relative rotation of the first and second hinged elements and wherein weight of the panel is such that the torque produced is greater than 1 Nm;
   wherein, when the first and second hinged elements are in an open position, each of the first and second molded housings has a surface facing the first and second molded outer links that are sloped away from the first and second molded outer links thereby defining a gap between the first and second molded housings and the first and second molded outer links; and
   wherein the surfaces of the first and second molded housings engage the first and second molded outer links when the first and second hinged elements are in a closed position.

2. The overmolded hinge device of claim 1, wherein the first and second hinged elements have an upper surface and mounting features to which first and second molded housings are coupled such that the first and second molded housings are recessed relative to the upper surfaces and no part of the first and second molded housings and no part of the first and second molded links extend above the respective upper surfaces of their respective hinged elements.

3. The overmolded hinge device of claim 1, further comprising a second friction element mounted on the second shaft.

4. The overmolded hinge device of claim 3, wherein the first friction element comprises a first plurality of clips and the second friction element comprises a second plurality of clips, wherein the number of clips of the first plurality of clips is less than the number of clips of the second plurality of clips such that the torque on the first shaft is less than the torque on the second shaft.

5. The overmolded hinge device of claim 4, wherein the first and second shafts travel with the second hinged element as the second hinged element is rotated relative to the first hinged element due to the lesser torque on the first shaft relative to the second shaft.

6. The overmolded hinge device of claim 1, wherein the first molded outer link at least partially encloses the first end of each of the first and second shafts, and wherein the second molded outer link at least partially encloses the second ends of each of the first and second shafts.

7. The overmolded hinge device of claim 3, wherein one of the second molded housing, first molded outer link, and second molded outer link at least partially encloses the second friction element and the second shaft.

8. The overmolded hinge device of claim 1, wherein the first molded housing does not enclose any portion of the second shaft and wherein the second molded housing does not enclose any portion of the first shaft.

9. The overmolded hinge device of claim 1, wherein the first and second ends of each of the first and a second shafts comprise knurls.

10. An overmolded friction hinge device comprising:
  a first and a second shaft, each having first and second ends;
  a first friction element mounted on the first shaft;
  a first molded housing at least partially enclosing the first shaft;
  a first hinged element coupled to the first molded housing;
  a second molded housing at least partially enclosing the second shaft;
  a second hinged element coupled to the second molded housing;
  a first molded outer link at least partially enclosing each of the first and second shafts; and
  a second molded outer link at least partially enclosing each of the first and second shafts;
  wherein, when the first and second hinged elements are in an open position, each of the first and second molded housings has a surface facing the first and second molded outer links that are sloped away from the first and second molded outer links thereby defining a gap between the first and second molded housings and the first and second molded outer links;
  wherein the surfaces of the first and second molded housings engage the first and second molded outer links when the first and second hinged elements are in a closed position;
  wherein one of the first molded housing and the first molded outer link are overmolded over and enclose the first friction element such that first friction element is embedded within one of the first molded housing and the first molded outer link such that there is no relative movement between the first friction element and the first molded housing or the first molded outer link; and
  wherein the relative rotation of the first and second hinged elements about the first shaft produces a first torque, wherein the relative rotation of the first and second hinged elements about the second shaft produces a second torque, and where the first torque is different than the second torque.

11. The overmolded hinge device of claim 10, wherein the first hinged element comprises a weighted panel, wherein a torque is produced by the relative rotation of the first and second hinged elements and wherein weight of the panel is such that the torque produced is greater than 1 Nm.

12. The overmolded hinge device of claim 10, wherein the first and second hinged elements have an upper surface and mounting features to which first and second molded housings are coupled such that the first and second molded housings are recessed relative to the upper surfaces and no part of the first and second molded housings and no part of the first and second molded links extend above the respective upper surfaces of their respective hinged elements.

13. The overmolded hinge device of claim 10, further comprising a second friction element mounted on the second shaft.

14. The overmolded hinge device of claim 13, wherein the first friction element comprises a first plurality of clips and the second friction element comprises a second plurality of clips, wherein the number of clips of the first plurality of clips is less than the number of clips of the second plurality of clips such that the torque on the first shaft is less than the torque on the second shaft.

15. An overmolded friction hinge device comprising:
  a first and a second shaft, each having first and second ends;
  a first friction element mounted on the first shaft;
  a second friction element mounted on the second shaft;
  a first molded housing at least partially enclosing the first shaft;
  a first hinged element coupled to the first molded housing, the first hinged element comprising a heavy panel;
  a second molded housing at least partially enclosing the second shaft;
  a second hinged element coupled to the second molded housing;
  a first molded outer link at least partially enclosing each of the first and second shafts; and
  a second molded outer link at least partially enclosing each of the first and second shafts;
  wherein one of the first molded housing and the first molded outer link are overmolded over and enclose the first friction element such that first friction element is embedded within one of the first molded housing and the first molded outer link such that there is no relative movement between the first friction element and the first molded housing or the first molded outer link; and
  wherein a torque is produced by the relative rotation of the first and second hinged elements between an open position and a closed position, and wherein weight of the panel is such that the torque produced is greater than 1 Nm; and
  wherein in the open position each of the first and second molded housings has a surface facing the first and second molded outer links that are sloped away from the first and second molded outer links thereby defining a gap between the first and second molded housings and the first and second molded outer links, and wherein in the closed position the surfaces of the first and second molded housings engage the first and second molded outer links.

* * * * *